Figure 1:
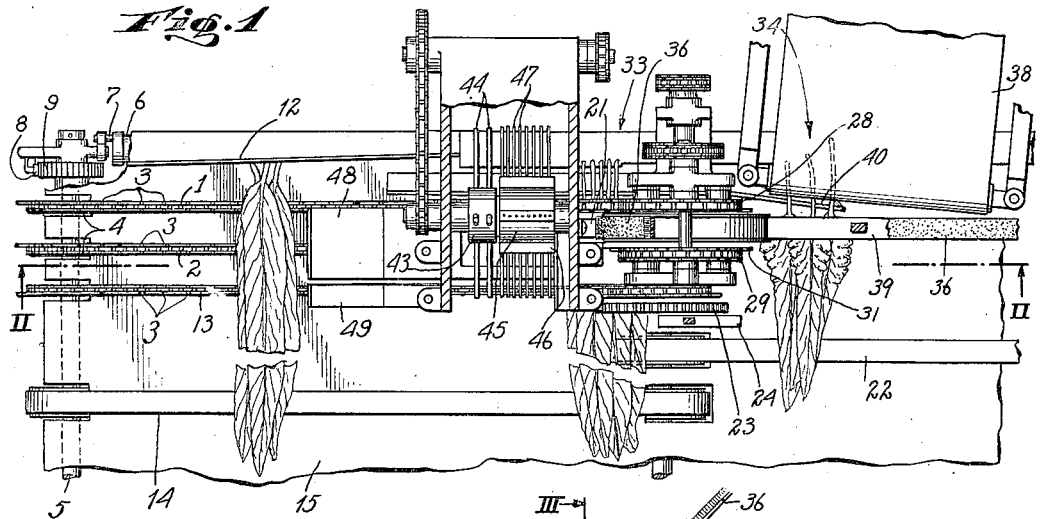

Aug. 16, 1938.   J. GOUGH   2,127,113

LEAF MACHINERY

Filed June 28, 1934

INVENTOR.
Joseph Gough
BY Jeffery, Kimball & Eggleston
ATTORNEYS.

Patented Aug. 16, 1938

2,127,113

UNITED STATES PATENT OFFICE 2,127,113

LEAF MACHINERY

Joseph Gough, Newark, N. J., assignor, by mesne assignments, to Samuel Johnson and Joseph Bower, doing business as Johnson Machinery Exchange, Newark, N. J.

Application June 28, 1934, Serial No. 732,863
In Great Britain November 3, 1933

4 Claims. (Cl. 131—57)

The tobacco of some fields is gathered into bunches, the stems of each bunch being more or less twisted together and intertwined, and in this condition is dried.

My invention, an improvement on the subject matter of Patent No. 1,987,103 issued on my copending application Serial No. 571,818 filed October 29, 1931, relates to preparing such leaf bunches for further operations; more particularly, to somewhat separating the stems or the stem ends of the leaves from each other so that the leaves can be dealt with satisfactorily in subsequent operations.

In using a machine or device of my invention, I contemplate, unless the bunches are composed initially of but a few leaves, that each bunch will be broken open, i. e., more or less broken and flattened out or even divided into separate smaller bunches, in any event appearing as more or less separate masses or aggregates of a few leaves each. This operation can be done rapidly by hand, preliminary to the introduction of the leaves to my device.

In brief, my invention includes a conveyor on which these leaf masses or aggregates are laid successively, a table or rest, usually separate and distinct from the conveyor, onto which the conveyor passes the masses, and especially the stem ends of the leaf masses, and a revolving finger or series of fingers, e. g. a finger or series of fingers protruding from a rotating disc, a belt or the like, to thrust into the leaf masses, and especially into the midst of the stems as the masses bear on the table, and then move in a direction to carry the leaf aggregates away from the conveyor and table; the fingers enter the masses more or less at right angles to the table top, and the finger device is driven at a higher speed than the conveyor as it were, so as to act a number of times on substantially each mass or aggregate and thereby more or less separate at least the bunched stems from each other. The finger device can and preferably does deliver into a second or receiving conveyor, which operates at least about the same speed as the finger device and preferably at a somewhat higher speed so as to maintain the separation established by the finger device or even increase this separation somewhat.

Usually it is not necessary to separate the blades of the masses from each other; in other words the finger device may operate on only the stem ends of the leaves and the blade portions of the various leaf masses may be allowed to simply follow along with their stems, or a simple conveyor device or devices may be added to help transport the blade portions along with the stems.

The second or receiving conveyor referred to above may serve no other purpose than that indicated, or it may be a conveyor or other part of a machine performing some operation on the leaves. For example, it may be the blade stripper or one of the blade strippers of a stemming machine. An instance of this is illustrated in the embodiment of my invention shown in the accompanying drawing.

It will be observed of course that a machine or device of my invention may be used as a feeder for a machine performing operations on leaves, it being understood that part of the leaf-processing machine may be also a part of the machine or device of the present invention, as above indicated.

Other details of construction of more or less importance appear hereinafter.

Figure 2:
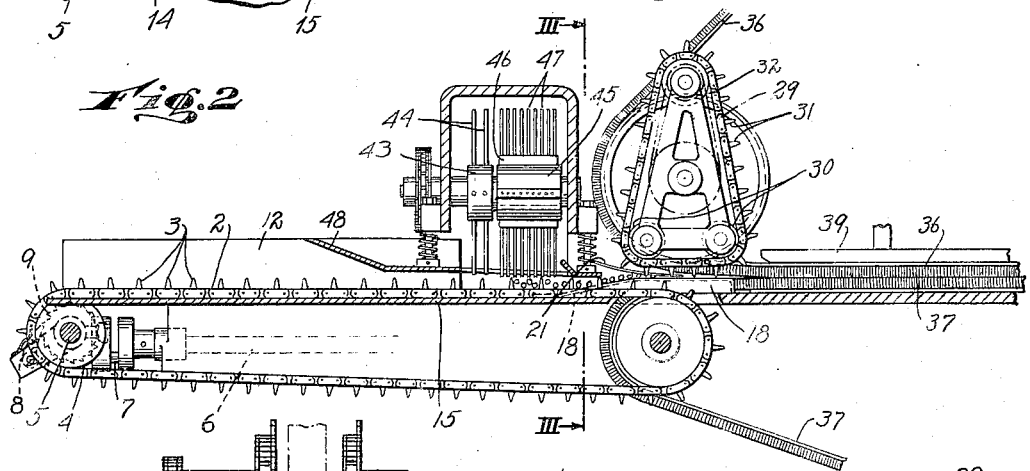
Figures 3, 4:
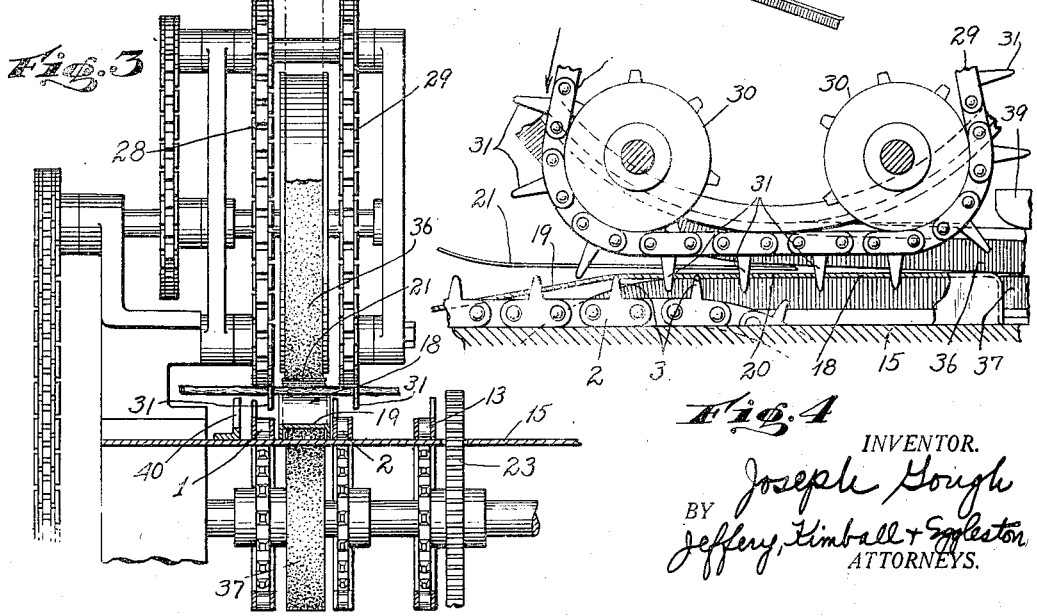

In the accompanying drawing, which illustrates the preferred form of embodiment of my invention, Fig. 1 is a plan view, partly in section, of a device of my invention employed as a feeder of a stemming machine. Fig. 2 is a sectional elevation of the major part of the mechanism, substantially on the line II—II of Fig. 1, looking in the direction of the arrows. Fig. 3 is a sectional view substantially along the line III—III of Fig. 2, looking in the direction of the arrows. Fig. 4 is a detail of construction.

In the machine illustrated, the conveyor on which the leaf masses are laid consists of parallel chain belts 1 and 2, arranged to engage the leaf masses near their stem ends, as illustrated in Fig. 1. The blocks or links of these chains are provided with projecting teeth or pins 3 to engage the leaves, and these toothed belts are driven intermittently, step by step, in a direction to move the leaves to the right in the drawing; to this end, the supporting sprockets 4 at one end of these belts may be keyed to a common shaft 5, and the latter driven from its driving shaft 6 through a crank 7, pawl 8 and ratchet 9. I prefer a pawl and ratchet drive for this first initial conveyor, since this type of mechanism provides a convenient way of changing the effective speed of the first conveyor; for example, by changing the effective throw of the pawl in a well-known manner. A vertical plate 12 opposite the stem ends of the leaves provides a guide or index enabling the operator to place the leaves in the proper positions on the conveyor. Parallel belts 13 and 14 help to carry the blade portions of the leaf masses; these belts are driven at substantially the same speed as the conveyor belts 1 and 2, as by securing their driving pulleys on the same shaft 5. There is some advantage in making the belt 13 in the form of a chain belt with projecting pins 3, as illustrated; the belt 14 may be of canvas or leather, etc.; these matters are not of primary importance however. Underlying the upper runs of these belts, a plane top 15 of the machine framework helps to support the leaf masses between the belts.

The operator lays the leaf masses on the top 15 and conveyor belts at the left-hand side of the drawing in Figs. 1 and 2. Thence the conveyor or belts carry the leaves to the right to the table 18, carried on the frame of the machine between the right-hand ends of the chain belts 1 and 2 and thus in a side-by-side relation to the conveyor belts. Adjacent this table 18, the various conveyor belts before referred to may be supported on suitable idler pulleys. The shape of the table 18 and its relation to the right-hand end of the conveyor belts 1 and 2 are shown best in Figs. 3 and 4. Specifically, the top of this table rises as at 19 from below the conveyor belts 1 and 2, somewhat in advance of their right-hand supporting pulleys, to a substantially level portion 20 higher than the teeth or pins 3 of the conveyor, and extending from a point slightly to the left of the center of the adjacent conveyor-supporting pulleys to a point somewhat to the right thereof. As a result, the stem portions of successive leaf masses are thrust up the incline 19 of the table 20 by the engagement of the teeth or pins 3 of the conveyors with these masses, until the upward rise of the table raises the leaf masses from the conveyor teeth 3 and the respective mass passes above these teeth. Any individual mass is then free to move along the table 18, and as subsequent masses are forced up the incline 19, a mass or masses previously delivered on to the table are thrust along thereby. Thus the conveyor 1—2 is capable of moving successive leaf masses onto and over the table 18, but at the same time each mass on the horizontal portion 20 of the table is quite free of the conveyor to the extent that it may be operated on by the finger device without hindrance from the conveyor. A fairly light spring plate 21, pressing down onto the leaf masses, riding onto and over the table 18, may be employed to restrain any tendency of the leaf masses to pile up one on top of another. Inasmuch as the table 18 illustrated engages only the stem-ends of the leaf masses, it has little or no effect of course on the major or blade portions of the leaf masses, and the latter simply pass along to the right with the stem portions. As the blades leave the conveyor belt, such as 14, other belts 22 may be provided to receive the blades. A rotating disc, toothed wheel 23, or other guide, having the same center as the right-hand carrying pulleys and a somewhat greater diameter than the latter, may be used to assure disengagement of the leaf blades from such conveyor belts as 13, for example, and a guide plate 24 carried above the leaf blades may be employed to hold these blades against undue upward movement as the finger device is thrust into the stem ends of the leaf masses.

Preferably the finger device operates at both sides of the table 18, and has the form of two belts of fingers, 28 and 29, carried by at least two spaced pulleys or sprockets 30 adjacent the table 18, so that the fingers 31 of the belts 28 and 29 may travel in a substantially straight line for some distance along the table 18 (see Figs. 2 and 4); elsewhere, so far as desirable, the belts 28 and 29 may be supported in any manner, for example by an upper pulley or sprocket 32. The direction of movement of the finger device is shown by the arrow in Fig. 4 and the finger device is so disposed that the fingers 31 thrust into the leaf masses on the table in a direction more or less at right angles to the table top (i. e. downwardly at the left-hand end of Fig. 4), and then having thus entered the leaf masses move in a direction to carry the leaf aggregates away from the conveyor 1—2 and table 18 (i. e. at the portion 20 of the table 18 in Fig. 4). Furthermore, as before indicated, the finger device 28, 29, 31, is driven at a linear speed greater than the linear speed of the conveyor 1—2, and accordingly at a speed greater than the speed of movement of the leaf masses over the table 18 under the thrust of the conveyor 1—2. As a result, the fingers 31 of the finger device tend to separate the stems or stem portions of the leaves from each other, perhaps untwining them, and at least separating the stems farther from each other, somewhat as will be apparent from a comparison of the stem grouping opposite 33 in Fig. 1 with the stem grouping opposite 34 in the same figure. It will be understood however that the stems may not be separated from each other one by one, but possibly into groups of one, two or three stems; the number of stems in each group will depend of course somewhat on the number of fingers 31 and also on the relative speeds of the finger device and the conveyor 1—2. While the stems are more or less separated, the blades of the leaves may be left more or less intertwined in their initial condition.

As will thus be evident, the receiver of the leaves, with their stems more or less separated as before described, is not of primary importance to my invention, but as before indicated however, I prefer to employ a receiving conveyor to maintain or even increase the spacing between the stems or between the leaves. This receiving conveyor may be a part of a machine performing some operation on the leaves. It may be a leaf stemmer as illustrated in the drawing. The stemmer illustrated is of a well-known kind. In brief, a pair of cooperating belts 36 and 37 each provided with card clothing (i. e. a field of wires projecting from a canvas or other backing) acts to carry the leaves through the stemming station and strip the blades from the stems. At the stemming station, a pair of superposed belts 38 receives the ends of the stems between themselves and serves to draw the stems in a direction away from the stripping belts 36 and 37, as appears at 34 in Fig. 1; inasmuch as the blades cannot follow the stems through the wire field or fields of the card clothing, this serves to strip the blades from the stems, leaving the blades more or less bunched up against the card belts 36 and 37. After leaving the stemming station, these bunched blades are dropped or taken from the card belts in well-known ways which need not be described here. With such an arrangement, the finger device 28, 29 and 31 may be mounted to feed the separated stems into the grasp of the card clothing belts 36 and 37, these latter then acting as a receiving conveyor, and usually I so arrange the apparatus that these stripping belts 36 and 37 are driven at a greater linear speed than the finger belts 28 and 29, with the result that the spacing of the stems apart, as represented by 34 in contrast with 33 in Fig. 1, is accomplished in part by the difference in speed between the finger device and the blade stripper or strippers, and in part by the finger device which spaces the stems initially and thus permits the stripper belts to act effectively to increase the separation. In order to enable the fingers 31 of the finger device to feed the separated stems to a double-belt type of receiving conveyor most effectively, I have found it preferable to separate the two belts of the conveyor by a narrow V-shaped opening at their receiving end, such as will be observed between the card clothing belts 36 and 37 in Fig. 4, and to let the straight run of the finger device be located at this V opening, as will also be understood from Fig. 4. Usually it is desirable however that the card clothing belts 36 and 37 be substantially in engagement with each other throughout the whole of the stemming station; this and the V-shaped spacing between the card clothing belts can be obtained by such a relative placement of the card-clothing-belt supporting pulleys as will provide adequate spacing between the belts adjacent the finger device, and then pressing the belts together at the stemming station by, for example, a bracket-supported guide, such as a simple block 39 bearing downwardly at the stemming station on the lower run of the upper card clothing belt.

Usually, I provide an elongated support 40 for the ends of the stems to assure the entry of the leaf stems between the stem-pulling belts 38, this support extending as far to the right and left of the operating position of the finger device as may be necessary.

The foregoing constitutes a complete device of my invention. I have found however that it is somewhat advantageous to employ a comb, as it were, to somewhat straighten out the intertwined stems in advance of the finger device. Such a comb may be in the form of a rotating hub 43 provided with a number of projecting stiff wires 44, placed in the path of the stems and serving to comb through the bunched or intertwined stems, as the latter pass this part of the machine. It will be understood that the comb is driven or rotated at such a speed as to comb out the stems to the extent desired. It is also advantageous I find, to first butt the stems, before attempting to separate them; that is to say, remove the blade material for a little distance away from the extreme ends of the stems. This can be accomplished by any suitable butting device. For example, a rotating brush, and preferably such a rotating brush as that illustrated, namely, a hub 45 of some substantially rigid material, with projecting strips 46 of some flexible material, such as leather, these carrying rows of quite flexible metallic wires 47 and the whole being rotated at such a high speed as to sweep the blade material from the stems. The comb 43—44 and butter or stem cleaner are described more completely in Patent No. 1,973,806 issued on my copending application Serial No. 641,343 filed November 5, 1932. The plate guides 48 and 49 serve simply to depress the leaves well against the conveyor belts 1, 2 and 13 as and where necessary.

The mechanisms whereby the various parts above referred to are driven constitute no part of the present invention, and suitable driving mechanism for such parts is readily devisable. Therefore driving mechanism for these parts need not be mentioned further.

It will be understood of course that my invention is not limited to the details of construction illustrated and described above, except as may appear hereinafter in the claims.

I claim:

1. In a machine of the kind indicated, a toothed conveyor means for leaf masses, a table onto and over which said conveyor can thrust the leaf masses, said table having a side-by-side relation to said conveyor and causing the leaf masses to be raised from the teeth of the conveyor, and a revolving finger means to thrust into the leaf masses on said table in a direction more or less at right angles to the table top and then move in a direction away from the conveyor and along the table.

2. The subject matter of claim 1, characterized by the fact that said conveyor means includes a pair of parallel belts with projecting teeth to engage the stem-ends of the leaf masses, and said table rises between the belts of said pair.

3. In a machine of the kind indicated, a toothed conveyor means for leaf masses, a table onto and over which said conveyor can thrust at least the stem ends of the leaf masses, said table having a side-by-side relation to said conveyor and causing at least the stem ends of the leaf masses to be raised from the teeth of the conveyor, a revolving finger means to thrust into the stem ends of the leaf masses on said table in a direction more or less at right angles to the table top and then move in a direction away from the conveyor and along the table, means to support said finger means in such position that the finger means acts, on each portion of a leaf mass segregated by it, to move the same away from the conveyor after the table has caused the respective portion to be raised from the teeth of the conveyor, and means to revolve said finger means at such a speed, relative to the speed of the conveyor, that the said finger means acts on substantially each leaf mass a plurality of times.

4. In a machine of the kind indicated, a toothed conveyor means for leaf masses, a table onto and over which said conveyor can thrust at least the stem ends of the leaf masses, said table having a side-by-side relation to said conveyor and causing at least the stem ends of the leaf masses to be raised from the teeth of the conveyor, a pair of belts each provided with a series of fingers displaced from each other lengthwise of the respective belt to thrust into the leaf masses in a direction more or less at right angles to the table top, said belts being located at the opposite sides of said table and with fingers thereof extending across the edges of the table, and means to move said belts in a direction to move the fingers away from the conveyor and along the table.

JOSEPH GOUGH.